Oct. 22, 1940.  G. KENDE ET AL  2,218,915
CAMERA
Filed Oct. 28, 1939
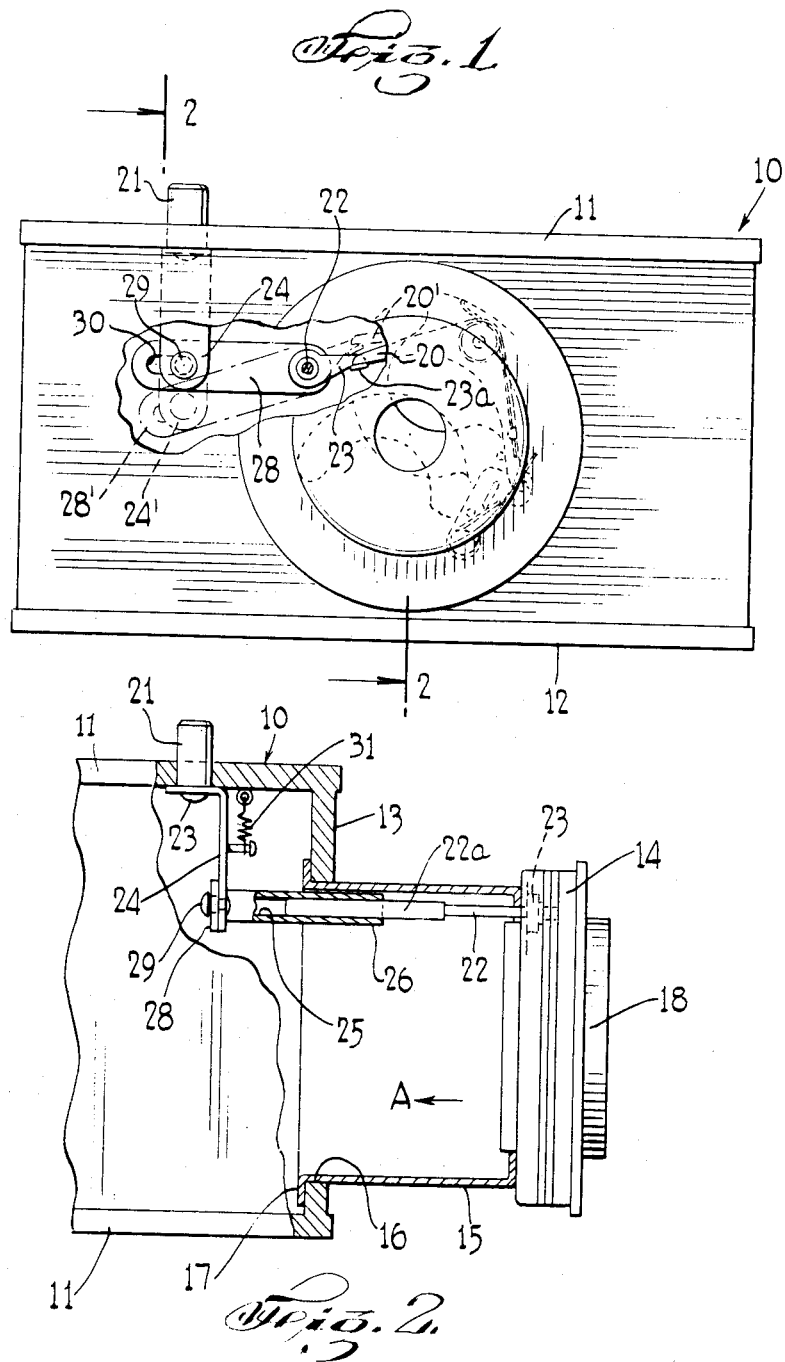
INVENTORS
GEORGE KENDE
OTTO K. CAZIN
BY
ATTORNEY Patented Oct. 22, 1940

2,218,915

UNITED STATES PATENT OFFICE 2,218,915

CAMERA

George Kende, New York, N. Y., and Otto K. Cazin, Hoboken, N. J., assignors to Universal Camera Corporation, New York, N. Y., a corporation of Delaware Application October 28, 1939, Serial No. 301,720

5 Claims. (Cl. 95—62)

This invention relates generally to cameras. More particularly, our invention relates to improved camera construction having means for operating an extensible shutter by a button mounted on the body of the camera.

One of the objects of our invention is to provide, in a camera of the type having a shutter extensibly mounted with respect to the body, an improved mechanism for actuating the shutter from an operating member on the body of the camera and in which the said mechanism is so designed that it will not interfere with the normal operation of the slidable lens tube.

Another object of our invention is to provide a shutter operating mechanism of the character described which shall be characterized by its simplicity of assembly and by its high degree of efficiency in operation.

Still another object of our invention is to provide, in combination with a camera having a shutter which is extensible with respect to the body, improved means for actuating said shutter from a button on the camera body, in which the shutter operating means is concealed wholly within the camera.

Other objects of this invention will in part be obvious and in part hereinafter pointed out.

The invention accordingly consists in the features of construction, combinations of elements, and arrangements of parts which will be exemplified in the construction hereinafter described, and of which the scope of application will be indicated in the claims.

In the accompanying drawing, in which is shown one of the various possible embodiments of this invention:

Fig. 1 is a front elevational view of a camera embodying our invention, in which portions are broken away to disclose the construction thereof; and Fig. 2 is a cross-sectional view taken substantially on the line 2—2 of Fig. 1.

Referring now in detail to the drawing, there is disclosed a camera 10 which may be of any suitable construction having a camera body comprising top and bottom walls 11 and 12 respectively and a front wall 13. The type of camera to which our invention is preferably adapted to be applied is of the kind having a shutter mounted so that it may be slidably moved to extended or operative picture taking position with respect to the camera body. Such construction may comprise a shutter housing 14 which is fixedly attached to the outer end of a lens tube 15, the said lens tube being slidably mounted in a corresponding opening 16 in the front wall 13 of the camera. The lens tube 15 may be provided, at the inner end thereof, with an outwardly extending flange 17 adapted to abut the front wall 13, to limit the outward sliding movement of the said lens tube. In Fig. 2 the shutter housing 14 and the lens member 18 attached thereto are shown in their outermost extended position, which is the normal picture-taking position. When the camera is not being used, the lens tube 15 is designed to be slidably moved inwardly in the direction of the arrow A to collapsed position.

The shutter housing 14 is designed to support any suitable type of shutter well known to the art and which is adapted to be actuated by a trip lever 20 of any suitable design. The said lever 20 is pivotally mounted so that, upon rotation thereof, it will actuate the shutter in the manner well known to the art. In the type of camera heretofore made, the means employed for actuating the shutter consisted either of manually moving the lever 20, or connecting thereto a bulb device, which, when pressed, would move the lever 20 to cause actuation of the shutter. In accordance with our invention, we have provided a mechanism by means of which the shutter, in a camera of the type having an extensible shutter, may be actuated by a button or similar operating member mounted on the body of the camera when the shutter is in its extended or picture-taking position. Such mechanism comprises a button 21 slidably mounted in the top wall 11 of the camera. Rotatably supported in the shutter housing 14 is a shaft 22, whose axis is disposed parallel to the axis of rotation of the shutter mechanism within the housing 14, and which extends inwardly of the said housing 14 and is disposed within the lens tube 15. The shaft 22 is fixed to the shutter housing 14 for integral movement therewith, so that when the said housing 14 is moved inwardly in the direction of the arrow A (Fig. 2), the shaft 22 will correspondingly be moved in the same direction.

Fixedly attached to the shaft 22 for rotation therewith is a lever 23 having a bent-up ear portion 23a disposed in the path of the lever 20, so that, upon rotational movement of the lever 23 in a counterclockwise direction, the said ear 23a will contactively engage the lever 20 to move the same in a clockwise direction, to thereby actuate the shutter within the housing 14.

The following means are provided for causing rotational movement of the lever 23 in a counterclockwise direction whenever the button 21 is moved downwardly. Rigidly attached to the button 21 by any suitable attaching means, such as the rivet 23, is a rigid depending arm 24. A portion 22a of the shaft 22 is axially slidably received in the opening 25 of a bearing member 26. The bearing 26 is fixedly attached to one end of a link 28, the said link 28, in turn, being pivotally mounted at the opposite end thereof on the arm 24, by means of the pivot member 29. The link 28 is pivoted with a slot 30, in which the pivot 29 is adapted to move. A spring 31 is provided to normally maintain the button 21 in its uppermost projecting position, as shown in Fig. 2 of the drawing.

In accordance with the above description, it is seen that when it is desired to actuate the camera shutter, it is merely necessary to press the button 21 downwardly against the action of the spring 31. The arm 24, being rigidly attached to the button 21, will move downwardly to the dotted line position 24', shown in Fig. 1, which, in turn will move the link 28 corresponding to the dotted line position 28'. It is noted that during such movement of the link 28, the pivot 29 will freely move in the slot 30. The link 28, being rigidly attached to the bearing member 26, which in turn is journaled for rotational movement, will cause rotation thereof in a counterclockwise direction. The opening 25 in the bearing 26 is preferably non-circular in cross-sectional contour, and the shaft portion 22a of the shaft 22 is of a corresponding cross-sectional contour, so that rotation of the bearing 26 will simultaneously rotate the shaft 22. The lever 23, being fixed to the shaft 22 for movement therewith, will also rotate in a counterclockwise direction and, after abutting the lever 20, will move the same in a clockwise direction to the dotted line position 20' (Fig. 1), to thus actuate the shutter. When the button 21 is released, the spring 31 will restore it to its original position.

While in the above we have described the shaft portion 22a and the bearing opening 25 as being correspondingly shaped in cross-sectional contour to cause them to rotate as a unit, it is understood that any other suitable means, such as a key, may be employed for causing simultaneous rotation of the shaft 22 and the bearing 26. Since the shaft portion 22a is slidably mounted in the bearing 26, it is noted that when the shutter housing 14 is moved in the direction of the arrow A to its innermost or collapsed position, the shaft 22 will freely move within the bearing 26 to permit the unhampered movement of the lens tube 15. Similarly, when it is desired to move the shutter housing to its outermost position, the shaft portion 22a will slidably move in the bearing 26.

It is also noted in connection with the above description that the mechanism designed to actuate the shutter from a button on the body of the camera is wholly concealed within the camera.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described our invention, we claim as new and desire to secure by Letters Patent:

1. In combination, a camera body, a rigid tube extensible with respect to said body, a lens and shutter housing closing off the forward end of said tube, a shutter contained within said housing, means for tripping said shutter, said tripping means comprising telescoping members disposed within said tube and said body and rotatably mounted on said housing so as to extend only rearwardly therefrom, the cooperating telescoping portions of said members being of mating non-circular cross-sections, a trip button mounted in and having a portion disposed exteriorly of said body, and means within said camera for connecting said button and said telescoping members to cause rotation of said members upon actuation of said button.

2. In combination, a camera body, a rigid tube extensible with respect to said body, a lens and shutter housing closing off the forward end of said tube, a shutter contained within said housing, means for tripping said shutter, said tripping means comprising a shaft disposed within said tube and rotatably mounted on said housing so as to extend only rearwardly therefrom, a second shaft telescopically mounted with respect to said first mentioned shaft and disposed within said tube and said body, means to cause said shafts to rotate together, a trip button mounted in and having a portion disposed exteriorly of said body, and means within said camera for connecting said button and said second shaft to cause rotation of said shafts upon actuation of said button.

3. In combination, a camera body, a rigid tube extensible with respect to said body, a lens and shutter housing closing off the forward end of said tube, a shutter contained within said housing, means for tripping said shutter, said tripping means comprising a shaft disposed within said tube and rotatably mounted on said housing so as to extend only rearwardly therefrom, a second shaft telescopically mounted with respect to said first mentioned shaft and disposed within said tube and said body, means to cause said shafts to rotate together, a trip button mounted in and having a portion disposed exteriorly of said body, and means within said camera for connecting said button and said second shaft to cause rotation of said shafts upon actuation of said button, said last named means comprising an arm rigidly attached to said button for movement therewith and a link rigidly affixed at one end directly to said second shaft for rotation therewith, and pivotally connected at the other end to said arm.

4. In combination, a camera body, a rigid tube extensible with respect to said body, a lens and shutter housing closing off the forward end of said tube, a shutter contained within said housing, means for tripping said shutter, said tripping means comprising a shaft disposed within said tube and rotatably mounted on said housing so as to extend only rearwardly therefrom, a second shaft telescopically mounted with respect to said first mentioned shaft and disposed within said tube and said body, means to cause said shafts to rotate together, a trip button mounted in and having a portion disposed exteriorly of said body, and means within said camera for connecting said button and said second shaft to cause rotation of said shafts upon actuation of said button, said last named means comprising an arm rigidly attached to said button for movement therewith, and a link rigidly affixed at one end to said second shaft for rotation therewith, said link having a slot at the other end thereof and a pin mounted on said arm slidable and rotatable in said slot.

5. In combination, a camera body, a rigid tube extensible with respect to said body, a lens and shutter housing closing off the forward end of said tube, a shutter and a shutter operating lever wholly contained within said housing, means for actuating said lever, said means comprising a shaft disposed within said tube and rotatably mounted on said housing so as to extend only rearwardly therefrom, a second shaft telescopically mounted with respect to said first mentioned shaft and disposed within said tube and said body, means to cause said shafts to rotate together, a trip button mounted in and having a portion disposed exteriorly of said body, and means within said camera for connecting said button and said second shaft to cause rotation of said shafts upon actuation of said button.

GEORGE KENDE.
OTTO K. CAZIN.